(No Model.)
J. ZOULEK.
BRACE FOR VEHICLE HOUNDS.
No. 489,778. Patented Jan. 10, 1893.
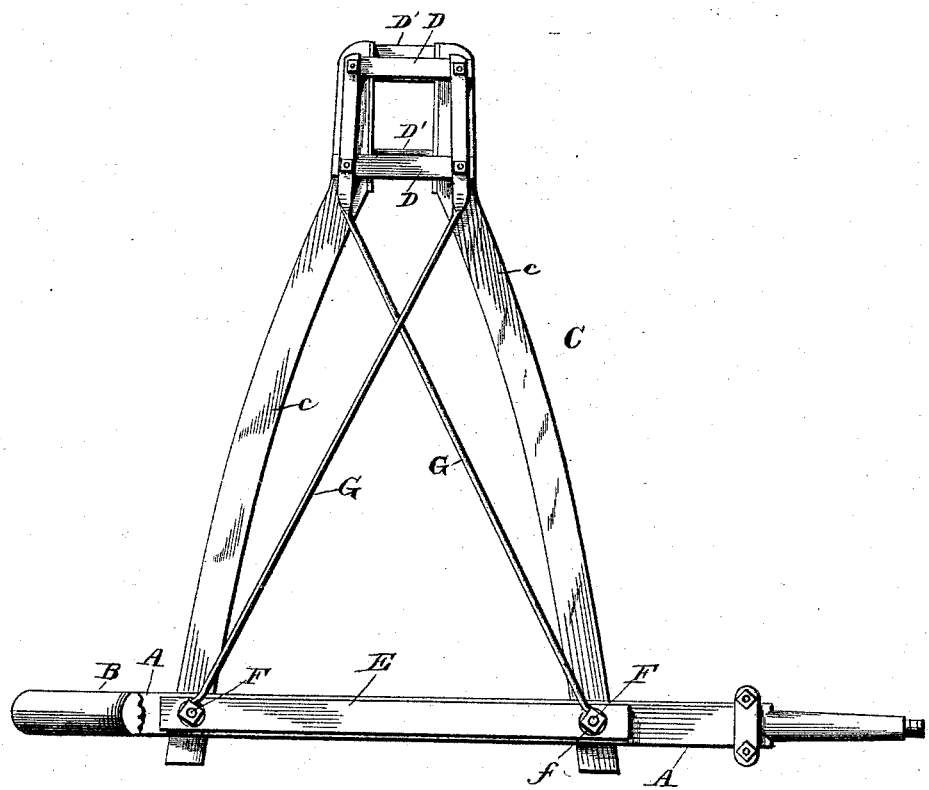
Witnesses
Wm. H. H. Knight
Arthur L. Bryant
Inventor
Joseph Zoulek
By his Attorneys
Edson Bro's.

UNITED STATES PATENT OFFICE.

JOSEPH ZOULEK, OF EAST JORDAN, MICHIGAN.

BRACE FOR VEHICLE-HOUNDS.

SPECIFICATION forming part of Letters Patent No. 489,778, dated January 10, 1893.

Application filed June 20, 1891. Renewed December 16, 1892. Serial No. 455,358. (No model.)

*To all whom it may concern:*

Be it known that I, JOSEPH ZOULEK, a citizen of the United States, residing at East Jordan, in the county of Charlevoix and State of Michigan, have invented certain new and useful Improvements in Braces for Vehicle-Hounds; and I do hereby declare the following to be a full, clear, and exact description of the invention, such as will enable others skilled in the art to which it appertains to make and use the same.

My invention relates to improvements in braces for the hounds of a vehicle, and the object is to strengthen the hounds and prevent the same from working loose and thereby prevent the wagon from tracking properly.

With these ends in view, my invention consists of crossed brace-rods attached at one end to a metallic plate secured on the underside of the rear axle and having their other ends attached to the lower sides of the hounds, near the forward end thereof.

My invention further consists of the peculiar construction and arrangement of parts as will be hereinafter more fully described and claimed.

To enable others to understand my invention, I have illustrated the same in the accompanying drawing, which represents a bottom plan view of the hounds of a wagon.

Referring to the drawing, A designates the rear axle of the wagon and B the rear bolster. Between the axle A and the bolster B are secured the hounds C. The side pieces, c, of the hounds C are connected near their outer ends by transverse bars or plates D, D', which plates in connection with the side pieces, c, form a socket for the reception of the rear end of the reach of the wagon, which reach, however, I have not deemed it necessary to illustrate as the same is well known to those skilled in the art. A metallic plate E is attached to the underside of the axle A; and the bolts F which pass through the axle, side pieces, c, of the hounds, and the bolster, also pass through apertures or openings formed in one end of two brace rods G. These brace rods are secured on the bolts F by nuts, f, and they extend diagonally across the space between the hounds. The outer ends of the braces or rods, which are preferably flattened and bent at an angle to the main portion of the brace, are attached to the transverse bars or plates D, by bolts or in any other suitable manner. By bracing the hounds in the manner herein shown and described, I am enabled to materially strengthen the hounds and the liability of the same to become broken or loose is greatly reduced.

Having thus described my invention, what I claim as new and desire to secure by Letters Patent, is:—

The combination, with an axle and bolster, of the hounds having their side pieces connected near their outer ends to form a socket for the reach and the braces attached at one end to the under side of the axle and extending diagonally across the open space between the hounds and having their forward ends connected to the side pieces of the hounds, substantially as described.

In testimony whereof I affix my signature in presence of two witnesses.

JOSEPH ZOULEK.

Witnesses:
C. L. LORRAINE,
G. L. SHERMAN.